(12) United States Patent
Reynolds et al.

(10) Patent No.: US 7,418,943 B2
(45) Date of Patent: Sep. 2, 2008

(54) SPARK ADVANCE FOE ENGINE IDLE SPEED CONTROL

(75) Inventors: Michael G. Reynolds, Troy, MI (US); David W. Walters, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/607,135

(22) Filed: Nov. 30, 2006

(65) Prior Publication Data

US 2008/0133112 A1    Jun. 5, 2008

(51) Int. Cl.
*F02P 5/15*      (2006.01)
*F02P 5/00*      (2006.01)

(52) U.S. Cl. .............................. 123/339.11; 123/406.23

(58) Field of Classification Search .................. 701/119; 123/305, 399, 339.11, 339.1, 339.15, 339.19, 123/406.24, 406.44

See application file for complete search history.

(56) References Cited

U.S. PATENT DOCUMENTS

| | | | | |
|---|---|---|---|---|
| 4,259,723 A | * | 3/1981 | Fujisawa et al. | 701/102 |
| 5,662,084 A | * | 9/1997 | Deguchi et al. | 123/339.11 |
| 5,713,328 A | * | 2/1998 | Anderson et al. | 123/299 |
| 5,884,605 A | * | 3/1999 | Nagaishi et al. | 123/339.11 |
| 6,516,777 B2 | * | 2/2003 | Yano | 123/339.19 |
| 6,651,619 B2 | * | 11/2003 | Ogiso | 123/339.11 |
| 6,834,638 B2 | * | 12/2004 | Lee | 123/339.11 |
| 6,932,053 B2 | * | 8/2005 | Ichihara et al. | 123/344 |
| 7,021,281 B2 | * | 4/2006 | Ruiz | 123/339.19 |
| 2007/0261669 A1 | * | 11/2007 | Buslepp et al. | 123/406.24 |

* cited by examiner

*Primary Examiner*—Willis R. Wolfe, Jr.
*Assistant Examiner*—Johnny H. Hoang

(57) ABSTRACT

An engine idle speed control system for regulating an idle speed of an internal combustion engine includes a first module that determines an indicated torque of the engine based on a current spark timing and a second module that determines a desired indicated torque based on the indicated torque. A third module determines a new spark timing based on the desired indicated torque and a fourth module that regulates operation of the engine based on the new spark timing.

10 Claims, 4 Drawing Sheets

SPARK ADVANCE FOE ENGINE IDLE SPEED CONTROL

FIELD

The present disclosure relates to spark-ignited internal combustion engines, and more particularly to determining spark advance for engine idle speed control.

BACKGROUND

The statements in this section merely provide background information related to the present disclosure and may not constitute prior art.

Internal combustion engines combust a fuel and air mixture to produce drive torque. More specifically, air is drawn into the engine through a throttle, which meters the air flow. The air is mixed with fuel and the air and fuel mixture is compressed within a cylinder using a piston. The air and fuel mixture is combusted within the cylinder to reciprocally drive the piston within the cylinder, which in turn drives a crankshaft of the engine. Combustion is initiated by creation of a spark in the cylinder by a spark plug. Spark timing is provided in terms of the angular position of the crankshaft relative to the piston achieving a particular position (e.g., top dead center (TDC)) within the cylinder, at which the spark is initiated.

There exists an optimal spark timing which produces the maximum engine torque for a given engine speed and mass of air and fuel mixture within the cylinder. This is called Maximum for Best Torque, or MBT. Combustion of the air and fuel mixture within the cylinder has variability with respect to the amount of torque created for a given spark advance and for a mass of air and fuel mixture. Combustion variability has many sources and will not be discussed here, but it causes a variable engine torque, which in turn causes variable engine speed.

During idle, it is desired to operate the engine at a predetermined engine speed. Since combustion variability causes varying engine speed, an engine idle speed control system should be able to compensate for this.

One method is to retard the average spark advance away from spark timing for MBT, and compensate engine speed error by changing spark advance on an individual cylinder firing event basis. Because this average spark timing is sub-optimal for a given fuel/air rate, the engine produces less torque than at the optimal spark timing. If additional torque is needed to increase the engine speed, the spark timing is advanced closer to spark timing for MBT to produce additional torque for same air/fuel rate. Similarly, if less torque is needed because the engine speed is higher than desired, the spark timing is retarded. The spark timing is adjusted because it can be executed much more quickly than changing air/fuel rate.

By regulating spark timing to less than optimal, this method of engine idle speed control maintains a torque reserve, which is the difference between the torque produced by the engine with spark timing for MBT, and the torque produced retarded spark timing. The torque reserve is established at a level that will maintain the engine speed above a predetermined minimum speed in the event of a large, unanticipated torque load on the engine (e.g., a full cramp of the power steering). Engine idle speed control generally utilizes only a maximum of approximately 30% of the torque reserve to account for combustion variability.

The amount of torque produced by a given change in spark timing for a fixed air/fuel rate depends on the current spark advance, the current air/fuel rate and the current engine speed. The relationship between engine torque and spark timing at a given air rate is described as non-linear curve that varies as the air rate changes and that flattens out as spark timing is advanced closer to MBT. This can present a problem to the idle speed control system.

If the torque reserve value is large, the change in engine torque for a change in spark timing (i.e., slope of the curve) over the normal spark control operating range is relatively constant. Therefore, a change in spark timing as a function of the difference between desired and actual engine speed maintains the engine sufficiently well with an air flow and spark timing invariant gain. The average spark timing is roughly 13° before TDC (BTDC) for an exemplary engine, and stays between 10° and 16° BTDC for an idle condition where loads are not changing, but combustion has typical variability. If the torque reserve is reduced, as may happen for a system with smaller unanticipated loads, the actual range of operation for spark timing changes and the slope of the curve can change rapidly over the normal spark control range.

Both the shape of the curve and the slopes vary widely between the curves for each air flow rate. As a result, using a spark timing invariant gain does not deliver acceptable engine speed control. This problem becomes compounded with differing engine idle speeds, which happens as the engine warms up. As a result, the required spark timing gain must be scheduled from a table, with multiple tables required to cover the range of engine idle speeds encountered during engine operation. It is very time consuming and cost intensive to accurately populate such a set of tables.

SUMMARY

Accordingly, the present invention provides an engine idle speed control system for regulating an idle speed of an internal combustion engine. The engine idle speed control system includes a first module that determines the indicated torque of the engine based on a current spark timing and a second module that determines a desired indicated torque based on the indicated torque. A third module determines a new spark timing based on the desired indicated torque and a fourth module regulates operation of the engine based on the new spark timing.

In one feature, the engine idle speed control system further includes a fifth module that determines a fraction of desired indicated torque based on the desired indicated torque and the indicated torque and a sixth module that determines a desired spark timing retard based on the fraction of desired indicated torque. The new spark timing is determined based on the desired spark timing retard.

In another feature, the engine idle speed control further includes a fifth module that determines a maximum best torque spark timing based on current engine operating parameters. The new spark timing is determined based on the maximum best torque spark timing.

In another feature, the engine idle speed control system further includes a fifth module that determines an indicated maximum best torque based on current engine operating parameters.

In still another feature, the engine idle speed control system further includes a fifth module that determines a torque delta, a current spark timing and an air mass flow (APC). The new spark timing is determined based on the torque delta, the current spark timing and the APC.

In yet another feature, the engine idle speed control system further includes a fifth module that determines a torque delta based on an engine idle speed error, wherein said new spark timing is determined based on the torque delta.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
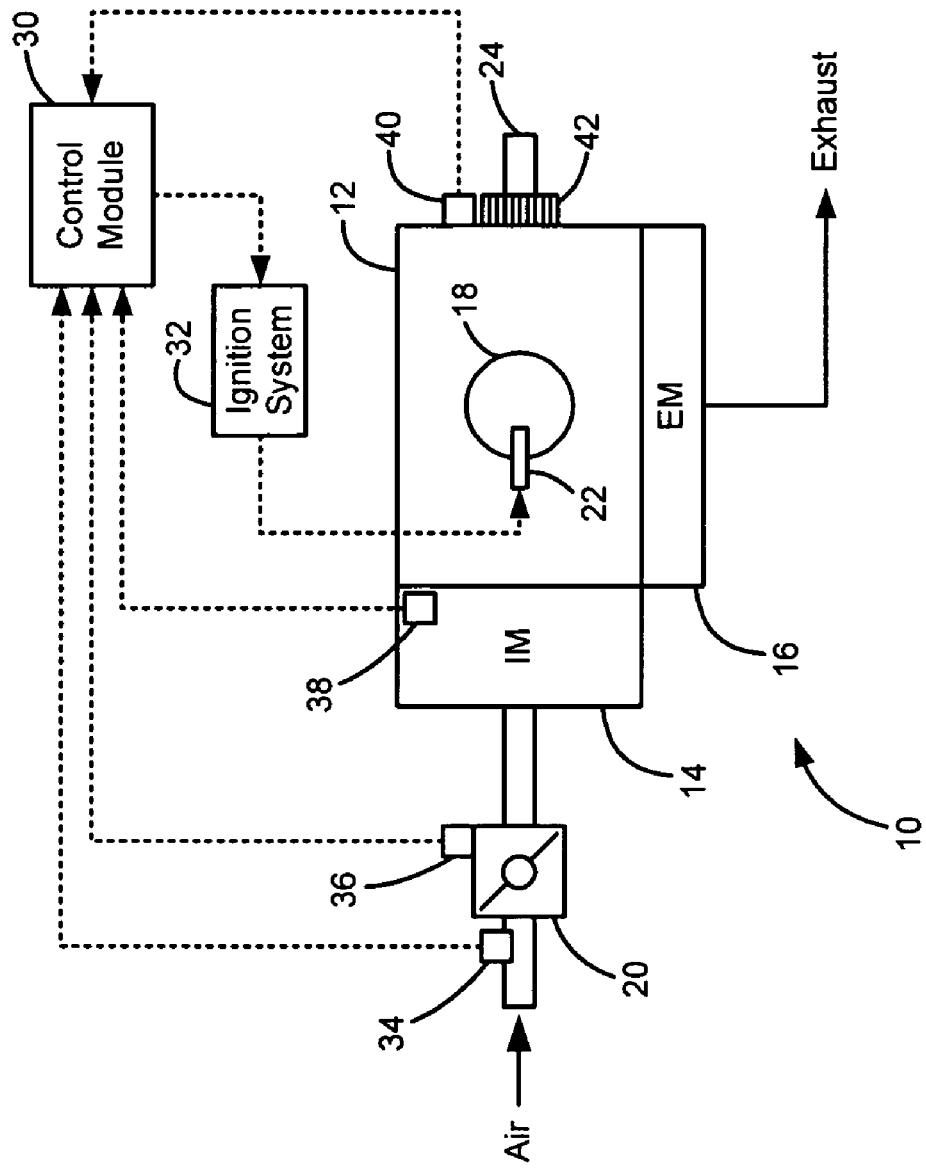
FIG. 1 is a functional block diagram of an exemplary engine system that is regulated using the engine idle speed control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 includes an engine 12, an intake manifold 14, an exhaust manifold 16 and at least one cylinder 18. Air is drawn into the intake manifold 14 through a throttle 20. The air is mixed with fuel and the air and fuel mixture is compressed within the cylinder 18 by a piston (not shown). A combustion process is initiated by a spark plug 22, which generates a spark. The combustion process reciprocally drives the piston within the cylinder 18 to rotatably drive a crankshaft 24. Exhaust generated by the combustion process is exhausted from the engine 12 through the exhaust manifold 16 and is treated in an after-treatment system (not shown) prior to being released to atmosphere. Although a single cylinder is illustrated, it is anticipated that the present invention can be applied to engines including a plurality of cylinders.

A control module 30 regulates operation of the engine system 10 based on the engine idle speed control of the present invention. More specifically, the control module 30 communicates with an ignition system 32 to regulate the spark timing. A plurality of sensors monitors engine operating parameters and communicate with the control module 30. The control module 30 processes the engine idle speed control based on the engine operating parameters. Exemplary sensors include a mass air flow (MAF) sensor 34, a throttle position sensor 36 and a manifold absolute pressure (MAP) sensor 38.

The plurality of sensors also includes a crankshaft rotation sensor 40 that generates a crankshaft rotation signal based on the rotational speed of the crankshaft 24. More specifically, the crankshaft rotation sensor 40 is responsive to a toothed wheel 42 that is fixed for rotation with the crankshaft 24. An exemplary toothed wheel includes a 60 minus 2 toothed wheel (i.e., 58 teeth), which are equally spaced around the outside circumference of the toothed wheel. More specifically, the spacing between the teeth is based on the toothed wheel including 60 teeth with 2 missing teeth. In this manner, a gap is provided between two of the teeth. The gap provides a reference point for determining the angular position of the crankshaft 24, discussed in further detail below.

The crankshaft rotation sensor 40 is responsive to the rising and falling edges of the teeth, and generates a pulse signal based thereon. The engine RPM is determined based on the pulse signal (i.e., the frequency between the rising and falling edges of the teeth). Similarly, the crankshaft angle is determined based on the pulse signal. For the exemplary 58-teeth wheel described above, each tooth, and thus each pulse, corresponds to 6° of crankshaft rotation, and the gap corresponds to 18°. Accordingly, the crankshaft angle can be determined based on the number of passing teeth since the gap was detected.

Spark timing ($\phi$) refers to the rotational position of the crankshaft 24, and thus the position of the piston within the cylinder 18, at which the spark plug 22 generates spark to initiate combustion. The piston reciprocally moves between a bottom dead center (BDC) position and a top dead center (TDC) position. When the crankshaft angle is 0°, as related to a specific cylinder, that piston is at TDC. For an exemplary engine, the spark timing ranges between 10° and 16° before TDC (BTDC) for an idle condition where loads are not changing. In other words, the spark plug 22 generates its spark when the crankshaft angle is between 10° and 16° before the piston achieves TDC.

The spark timing can be retarded or advanced to regulate the engine torque output. As discussed in detail above, the spark timing is typically set to be sub-optimal for a given fuel/air rate to provide a torque reserve. As a result, the engine produces less torque than at the optimal spark timing, which is the spark timing at which maximum best torque (MBT) is achieved. If additional torque is needed to increase the engine speed, the spark timing is advanced closer to MBT to produce additional torque for same air/fuel rate. The spark timing is adjusted because it can be executed much more quickly than changing air/fuel rate. Similarly, if less torque is needed because the engine speed is higher than desired, the spark timing is retarded.

Figure 2:
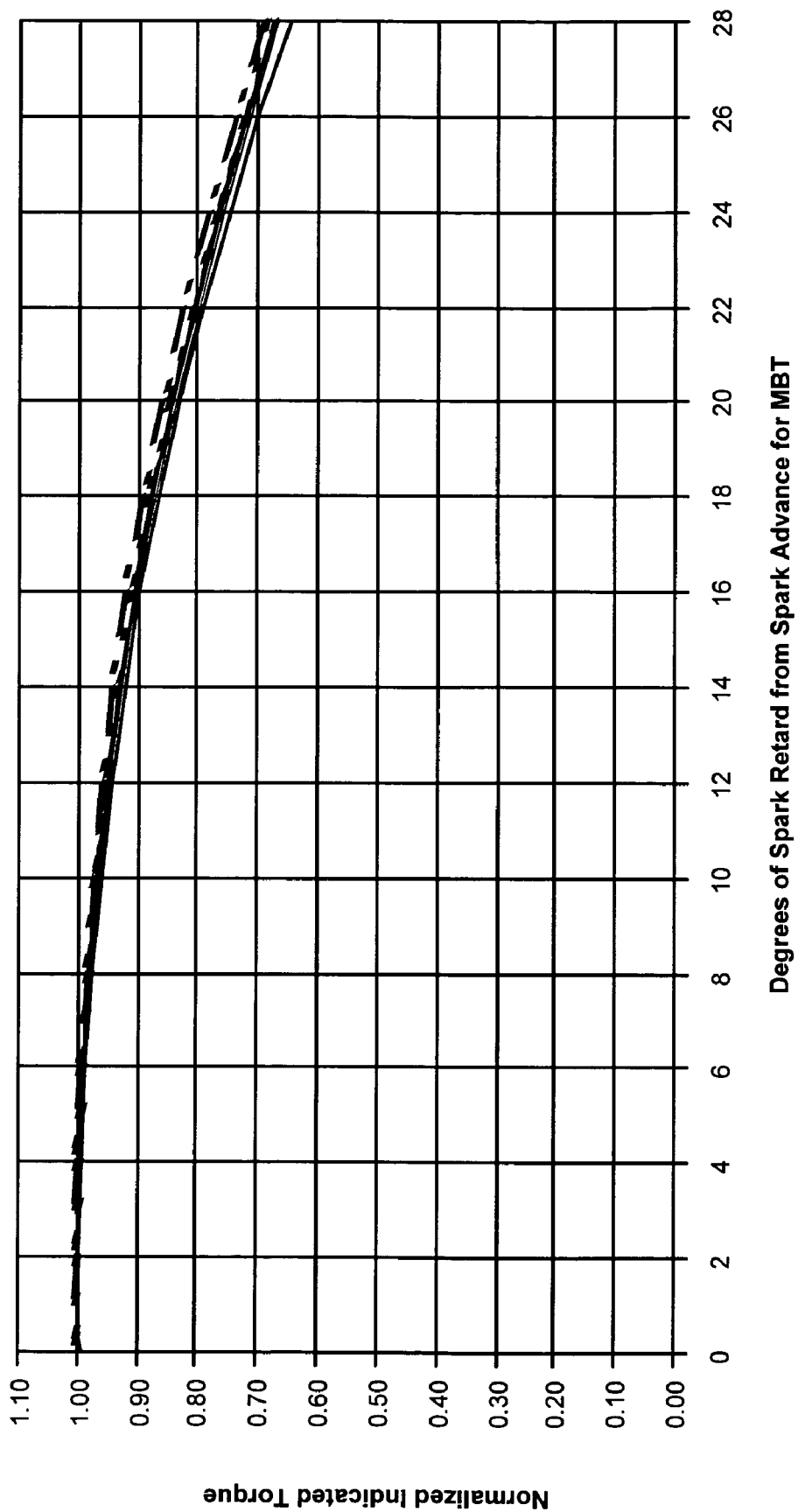
FIG. 2 is a graph illustrating exemplary traces of engine torque efficiency versus spark timing from MBT for various exemplary engine speeds and a fixed air mass flow rate.

Referring now to FIG. 2, the rate at which the normalized engine indicated torque decreases as a function of retarding spark timing from MBT is consistent over a wide range of operating speeds and air flows. With specific reference to FIG. 2, a plurality of curves are illustrated for various air flow rates and a fixed engine speed (e.g., 550 RPM), having an average curve laid over. The engine idle speed control of the present invention implements the average curve to determine spark timing for regulating engine idle speed. More specifically, after the engine idle speed control determines the amount of torque required to be added/subtracted from the current engine torque to correct an idle speed error, the necessary change in spark timing (i.e., advance or retard) from the existing spark timing is determined from the indicated torque versus spark retard curve.

Because the curve is normalized with the torque at MBT equal to 1 and because the spark timing must be retarded from the advanced spark timing at MBT, it is also required to know the value of torque at MBT as well as the total spark timing advance to achieve MBT. These are a function of engine RPM and air flow rate (or air mass per firing cylinder) at a sufficient number of engine speeds and air flow rates over the engine idle speed operating range. These data points are collected as part of the existing engine calibration procedure, so no additional dynamometer testing or other steps need be performed.

The engine idle speed control of the present invention can be divided into three components. The current indicated torque ($T_{IND}$) is determined, the desired indicated torque ($T_{INDDES}$) is calculated and the new spark timing ($\phi_{NEW}$) is calculated. It is assumed that the current engine RPM, spark timing ($\phi$), air flow rate (i.e., air mass per firing cylinder) (APC) and the desired change in torque ($\Delta T$) (e.g., positive to increase torque, negative to decrease torque) are inputs to the engine idle speed control, each having been determined by other portions of the general engine control system.

The engine idle speed control implements a first two-dimensional table to determine the current indicated MBT torque ($T_{INDMBT}$) based on engine RPM and APC. A second two-dimensional table is used to determine the spark timing required to achieve the MBT torque ($\phi_{MBT}$) (e.g., positive degrees for before TDC) based on engine RPM and APC. A one-dimensional table is used to determine the current fraction of indicated MBT torque ($f_{TINDMBT}$) based on the difference between $\phi_{MBT}$ and $\phi$ (e.g., positive degrees). A second one-dimensional table is used to determine $\phi_{RETDES}$ (e.g., positive degrees) based on a new desired value of $f_{TINDMBT}$. A new value of spark advance $\phi_{NEW}$ is then calculated as the difference between $\phi_{MBT}$ and $\phi_{RETDES}$.

The engine idle speed control is executed as follows. Initially, the current RPM and APC are used as inputs to the first two-dimensional table to determine $T_{INDMBT}$. The current RPM and APC are also used as inputs to the second two-dimensional table to determine $\phi_{MBT}$. The current $\phi$ is subtracted from $\phi_{MBT}$ to determine a spark timing difference ($\Delta\phi$), which is how many degrees current $\phi$ is retarded from $\phi_{MBT}$.

$\Delta\phi$ is used as an input to the first one-dimensional table to determine $f_{TIND}$. $T_{INDMBT}$ is multiplied by $f_{TIND}$ to determine $T_{IND}$. The desired change in torque ($\Delta T$) is added to $T_{IND}$ to determine $T_{INDDES}$, which is divided by $T_{INDMBT}$ to determine the desired fraction of MBT torque ($f_{TINDDES}$). $f_{TINDDES}$ is used as the input to the second one-dimensional table to determine the desired spark timing retard from MBT ($\phi_{RETDES}$). $\phi_{RETDES}$ is subtracted from $\phi_{MBT}$ to determine $\phi_{NEW}$.

It should be noted that, because indicated torque is used to determine spark advance, there is no requirement to have a full engine model in the software. Therefore, the engine idle speed control of the present invention can be applied to engine idle control systems, which are generally not torque based systems. To achieve this, engine speed error (i.e., difference between the desired RPM and the actual RPM) is converted to a desired change in engine torque ($\Delta T$) by multiplication using an appropriate constant. In this manner, idle speed error (rpm) is consistently and smoothly corrected over a wide range of speeds, airflows and spark advances, and minimal calibration is required.

Figure 3:
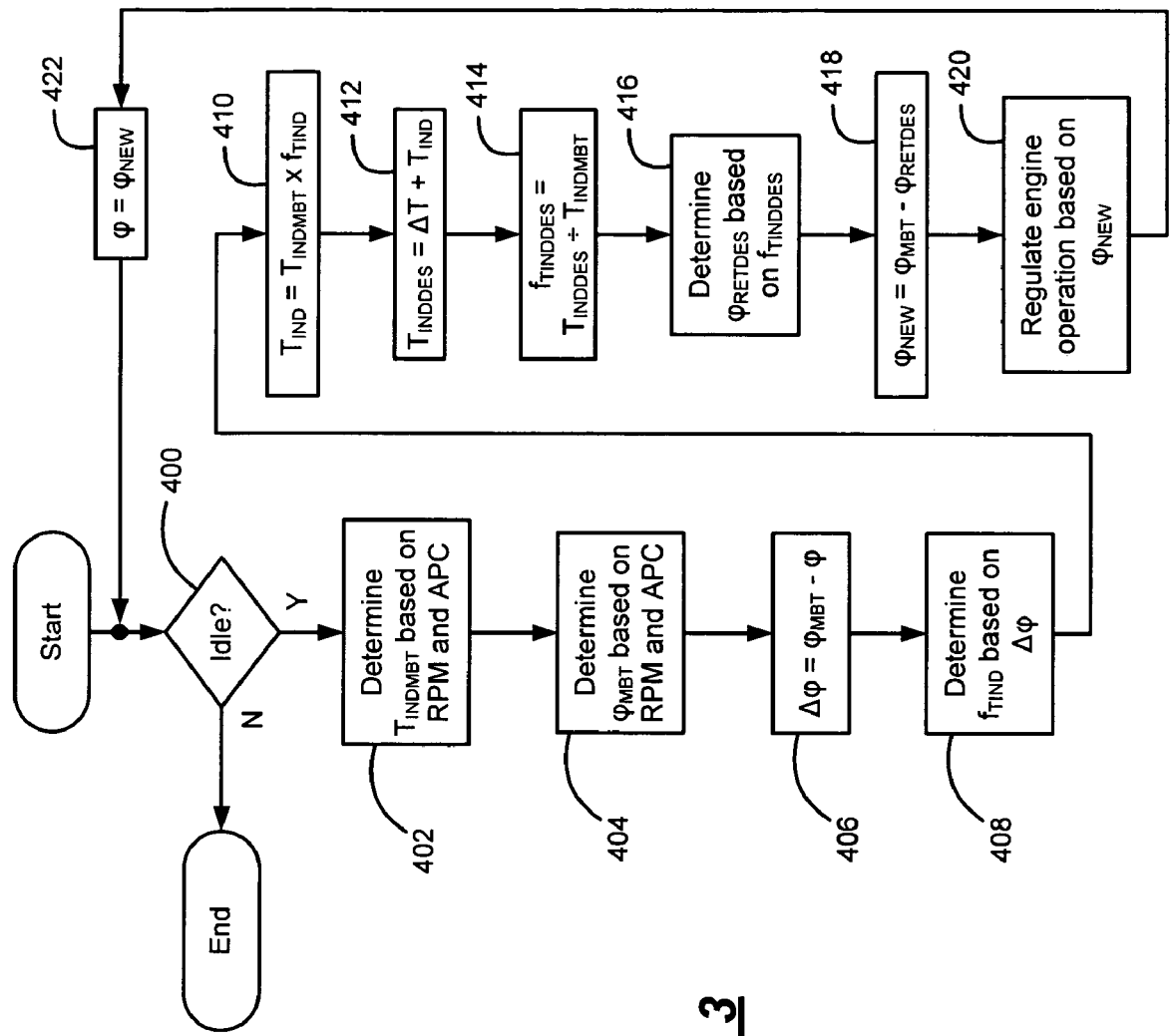
FIG. 3 is a flowchart illustrating exemplary steps executed by the engine idle speed control of the present invention.

Referring now to FIG. 3, exemplary steps executed by the engine idle speed control of the present invention will be described in detail. In step 400, control determines whether the engine is to be operated in idle. If the engine is not to be operated in idle, control ends. If the engine is to be operated in idle, control determines $T_{INDMBT}$ based on RPM and APC in step 402. In step 404, control determines $\phi_{MBT}$ based on RPM and APC. Control determines $\Delta\phi$ as the difference between $\phi_{MBT}$ and $\phi$ in step 406. In step 408, control determines $f_{TIND}$ based on $\Delta\phi$.

In step 410, control determines $T_{IND}$ as the product of $T_{INDMBT}$ and $f_{TIND}$. Control determines $T_{INDDES}$ as the sum of $\Delta T$ and $T_{IND}$ in step 412 and determines $f_{TINDDES}$ as the quotient of $T_{INDDES}$ and $T_{INDMBT}$ in step 414. In step 416, control determines $\phi_{RETDES}$ based on $f_{TINDDES}$ and control determines $\phi_{NEW}$ as the difference between $\phi_{MBT}$ and $\phi_{RETDES}$ in step 418. In step 420, control regulates engine operation based on $\phi_{NEW}$. In step 422, control sets $\phi$ equal to $\phi_{NEW}$ and loops back to step 400.

Figure 4:
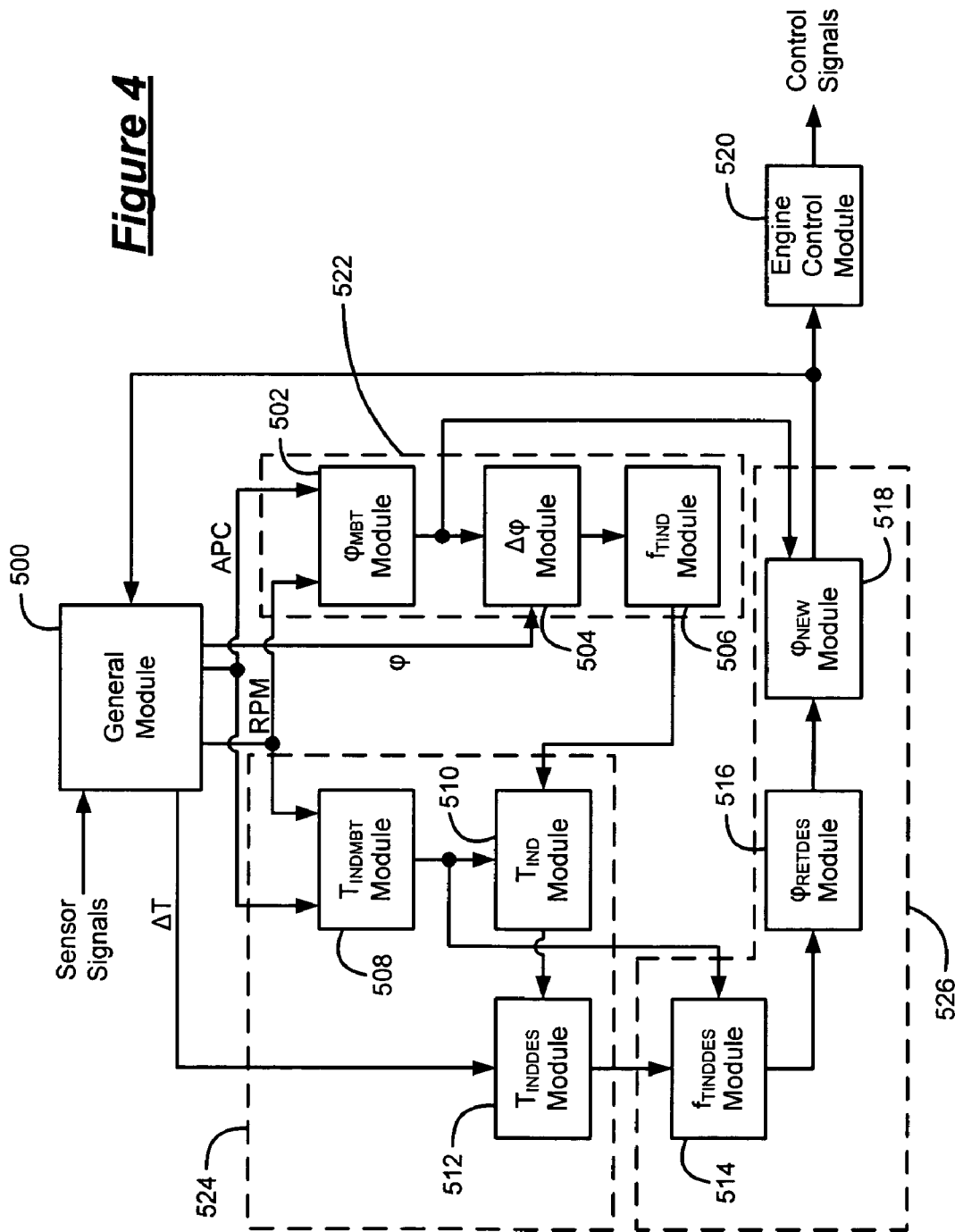
FIG. 4 is a functional block diagram illustrating exemplary modules that execute the engine idle speed control of the present invention.

Referring now to FIG. 4, exemplary modules that execute the engine idle speed control will be described in detail. The exemplary modules include a general module 500, a $\phi_{MBT}$ module 502, a $\Delta\phi$ module 504, a $f_{TIND}$ module 506, a $T_{INDMBT}$ module 508, a $T_{IND}$ module 510, a $T_{INDDES}$ module 512, a $f_{TINDDES}$ module 514, a $\phi_{RETDES}$ module 516, a $\phi_{NEW}$ module 518 and an engine control module 520. The general module 500 receives various sensor signal inputs (e.g., MAF, MAP, engine RPM) and determines $\Delta T$, $\phi$ and APC based thereon.

The $\phi_{MBT}$ module 502 determines $\phi_{MBT}$ based on RPM and APC. The $\Delta\phi$ module 504 determines $\Delta\phi$ based on $\phi_{MBT}$ and $\phi$ and the $f_{TIND}$ module 506 determines $f_{TIND}$ based on $\Delta\phi$. The $T_{INDMBT}$ module 508 determines $T_{INDMBT}$ based on RPM and APC and the $T_{IND}$ module 510 determines $T_{IND}$ based on $T_{INDMBT}$ and $f_{TIND}$. The $T_{INDDES}$ module 512 determines $T_{INDDES}$ based on $\Delta T$ and $T_{IND}$. The $f_{TINDDES}$ module 514 determines $f_{TINDDES}$ based on $T_{INDDES}$ and $T_{INDMBT}$. The $\phi_{RETDES}$ module 516 determines $\phi_{RETDES}$ based on $f_{TINDDES}$ and the $\phi_{NEW}$ module 518 determines $\phi_{NEW}$ based on $\phi_{RETDES}$ and $\phi_{MBT}$. $\phi_{NEW}$ is fed back to the general module 500 and the engine control module 520 generates control signals based on $\phi_{NEW}$.

It is anticipated that the exemplary modules can be organized as sub-modules of an upper level module. For example, the modules 502, 504, 506 can be sub-modules of a first module 522, the modules 508, 510, 512 can be sub-modules of a second module 524 and the modules 514, 516, 518 can be sub-modules of a third module 526. Similarly, the exemplary modules can all be sub-modules of a main control module, for example, the control module 30.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine idle speed control system for regulating an idle speed of an internal combustion engine, comprising:
   a first module that determines an indicated torque of said engine based on a current spark timing;
   a second module that determines a torque delta based on an engine idle speed error;
   a third module that determines a desired indicated torque based on said indicated torque and said torque delta;
   a fourth module that determines a new spark timing based on said desired indicated torque; and
   a fifth module that regulates operation of said engine based on said new spark timing.

2. The engine idle speed control system of claim 1 further comprising:
   a sixth module that determines a fraction of desired indicated torque based on said desired indicated torque and said indicated torque;
   a seventh module that determines a desired spark timing retard based on said fraction of desired indicated torque, wherein said new spark timing is determined based on said desired spark timing retard.

3. The engine idle speed control system of claim 1 further comprising a sixth module that determines a maximum best torque spark timing based on current engine operating parameters, wherein said new spark timing is determined based on said maximum best torque spark timing.

4. The engine idle speed control system of claim 1 further comprising a sixth module that determines an indicated maximum best torque based on current engine operating parameters.

5. The engine idle speed control system of claim 1 further comprising a sixth module that determines a current spark timing and an air mass flow (APC), wherein said new spark timing is determined based on said current spark timing and said APC.

6. A method of regulating an idle speed of an internal combustion engine, comprising:
- determining an indicated torque of said engine based on a current spark timing;
- determining a torque delta based on an engine idle speed error;
- determining a desired indicated torque based on said indicated torque and said torque delta;
- calculating a new spark timing based on said desired indicated torque; and
- regulating operation of said engine based on said new spark timing.

7. The method of claim 6 further comprising:
- calculating a fraction of desired indicated torque based on said desired indicated torque and said indicated torque;
- determining a desired spark timing retard based on said fraction of desired indicated torque, wherein said new spark timing is determined based on said desired spark timing retard.

8. The method of claim 6 further comprising determining a maximum best torque spark timing based on current engine operating parameters, wherein said new spark timing is determined based on said maximum best torque spark timing.

9. The method of claim 6 further comprising determining an indicated maximum best torque based on current engine operating parameters.

10. The method of claim 6 further comprising determining a current spark timing and an air mass flow (APC), wherein said new spark timing is determined based on said current spark timing and said APC.

* * * * *